July 8, 1941.  G. BRADSHAW  2,248,695
SCREW HEAD
Filed March 13, 1939
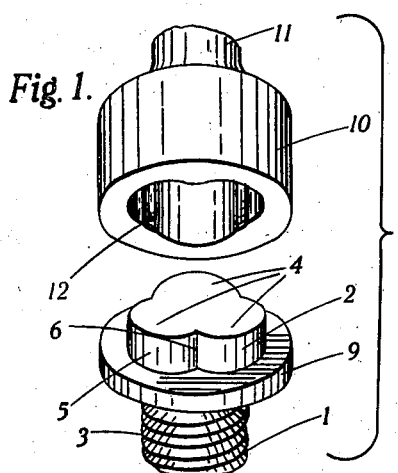
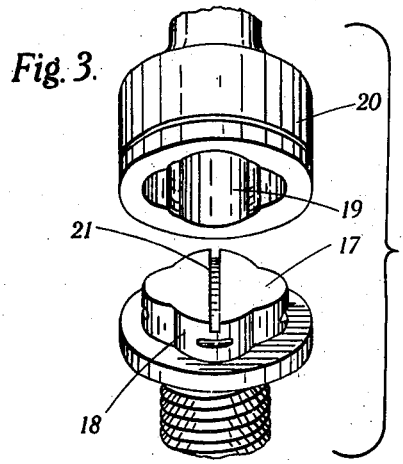
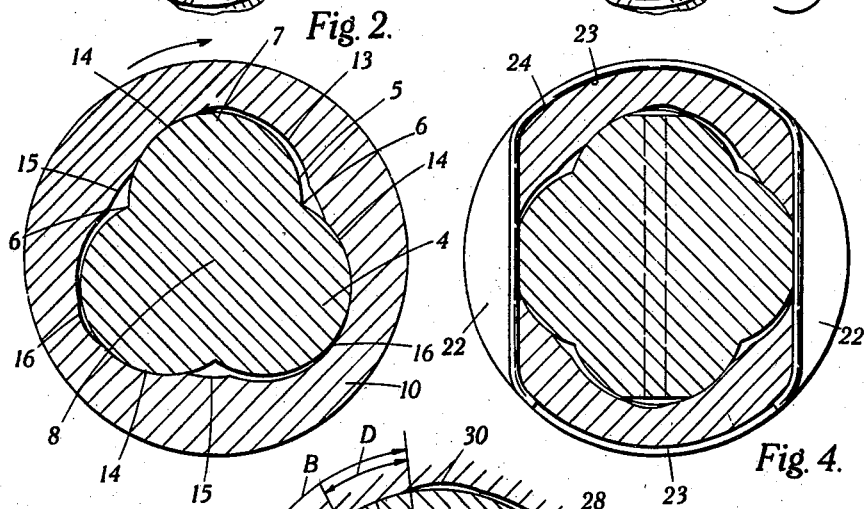
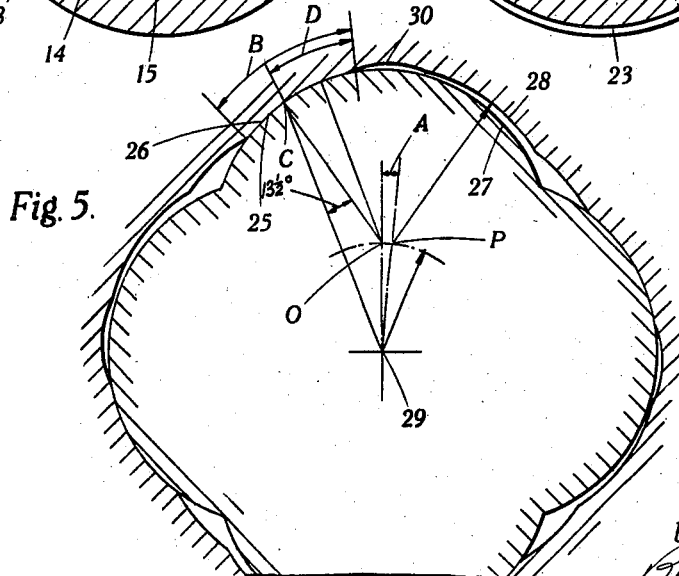
Inventor
G. BRADSHAW,
by
Attorney Patented July 8, 1941

2,248,695

UNITED STATES PATENT OFFICE 2,248,695

SCREW HEAD

Granville Bradshaw, London, England, assignor to The Bradshaw Patent Screw Company (Foreign) Limited, London, England, a British company Application March 13, 1939, Serial No. 261,608
In Great Britain March 17, 1938

3 Claims. (Cl. 85—45)

The present invention relates to improvements in or relating to screws, bolts, nuts and the like hereinafter referred to for convenience as "screws" and to devices for use in screwing or unscrewing them, hereinafter referred to as "screw-driving tools." The invention is applicable to screws for use in metal as well as to screws for use in wood or other materials, with ordinary or self-tapping threads.

With an ordinary screw with a slotted head and the usual chisel-shaped screwdriver there is practically point contact when the screwdriver is used for tightening the screw. The pressure at the points of contact is accordingly very high with the result that the screwdriver wears at the corners after it has been used a few hundred times and the heads of the screws become worn or distorted if they are screwed in and out more than a few times or if the resistance to screwing or unscrewing is great. In the case of hexagon headed nuts or bolts also, even with a relatively closely fitting spanner almost, if not all, the pressure is exerted at two opposite corners and initially there is, therefore, practically line contact only and the pressures are again very high. The results of this, namely distortion of the nut or bolt and/or spanner and slipping of the latter on the nut or bolt are well known. Moreover, in neither of these cases can the screw be attached to the screwdriver or spanner sufficiently securely to admit of satisfactory one-handed operation of the screwdriver or spanner, or to remain attached when using an electrically or mechanically operated screw-driving tool.

It is an object of the present invention to provide an improved screw which can be attached to a screw-driving tool so that it is not necessary to hold the screw itself when starting the screwing operation and accordingly the screw can be screwed into position using one hand only for the screw and screw-driving tool.

It is a further object of the invention to provide a screw which by reason of its capability for attachment to a screw-driving tool is adapted for high speed work with mechanically or electrically operated screw-driving tools.

It is a further object of the invention to provide an improved screw in the use of which, with an appropriate screw-driving tool there is reduced pressure per unit area on the contact surfaces of screw and screw-driving tool for a given transmitted torque as compared with screws now in common use.

The present invention in one aspect makes use of the fact that when two surfaces are in frictional contact it will not be possible to slide one over the other solely by application of a force exerted at an angle to the normal to the two surfaces which is equal to or less than the angle of friction. Similarly, when there is frictional contact between two surfaces and one surface is urged to slide over the other by a force acting at an angle to the surface against a force at right angles to the first force, then if that angle is equal to or less than the angle of friction for the said surfaces, the surfaces will not slide back relatively to one another upon cessation of the first force. In many practical cases it may be said that if the said angle is approximately equal to the angle of friction there will be a tendency for the two surfaces to stick together or bind.

The angle of friction for the materials commonly used for screws and screwdrivers is generally between twelve and fourteen degrees and is very unlikely to exceed 16° for any metals which it may be desired to employ.

According to one feature of the present invention there is provided a screw having two or more lateral curved surfaces eccentric with respect to the screw axis and adapted to be engaged by correspondingly formed surfaces of a screw-driving tool. Each said surface is preferably such that at every point over an appreciable zone the angle between the tangent to the surface at that point in a plane transverse to the screw axis, and a line perpendicular to the line joining the point to the axis of the screw is not greater than 16° and preferably is not greater than 14°.

According to the present invention also there is provided a screw having two or more lateral curved surfaces adapted to be engaged by correspondingly formed surfaces of a screw-driving tool, each said surface being such that at every point over an appreciable area the angle between the tangent to the surface at that point in a plane transverse to the screw axis and a line perpendicular to the line joining the point to the screw axis is not greater than the angle of friction between the said surface and the co-operating surface of the tool with which the screw is intended to be employed.

According to the present invention also there is provided a screw having two or more lateral curved surfaces adapted to be engaged by correspondingly formed surfaces of a screw-driving tool, said surfaces on the screw being such that they can lock or bind with the correspondingly formed surfaces on the tool upon the tool being urged to turn on the screw about the axis thereof.

According to a further feature of the invention a screw is provided on the head with three or more non-concentric lateral curved surfaces concave towards the screw axis.

It is to be understood that the aforesaid curved surfaces may be external surfaces on the head of the screw or alternatively they may be internal surfaces of a recess in the head of the screw.

In one form of screw according to the present invention the head of the screw may be provided with, for example, three or preferably four lateral bosses having outwardly convex curved side walls. The curved sides of adjacent bosses preferably meet one another at an angle of more than a right angle so that the plan or transverse cross-section of the head is of a shape somewhat resembling a three or four leafed clover leaf.

In some cases it may be desirable to provide a slot in the screw head in order to make possible the manipulation, especially the removal, of the screw with an ordinary screwdriver. In such case it will be preferred to provide four bosses or at all events an even number in order that a diametral slot may be symmetrical with respect to the screw axis.

If desired, a flange may be provided round the base of the head, which may serve for preventing the screwdriving tool from going too far down over the screw shank and/or to prevent the screw from being screwed too far into the work. Moreover, above the flange, where one is provided, the head may be undercut or chamfered and such chamfered or undercut portion may serve, with a suitably shaped part of a screw-driving tool, for drawing the tool and screw more closely into engagement.

The sectional area of the head of the screw is preferably equal to or greater than the sectional area of the screw shank at the base of the thread so that the head shall be capable of withstanding all the torque that is necessary in tightening the screw without the danger of the head snapping off. It will be apparent that a standard sized head may be employed for screws of a number of different sizes and in that case one size of screw-driving tool may be used with screws of a number of different sizes.

A screw-driving tool according to the present invention is provided with two or more lateral curved surfaces adapted to engage over an appreciable area with the aforesaid surfaces of the screw. Thus, the screw-driving tool may have a recess adapted to fit over the head of a screw. It is not necessary, however, that the said recess should conform exactly to the shape of the screw head, but it is necessary that when the tool and screw are assembled together and a turning moment is applied to the tool with respect to the screw, the co-operating surfaces of the tool and of the screw head must come into engagement over curved areas of appreciable size and preferably that they should to some extent bind or lock by frictional engagement.

Thus, in a screw-driving tool intended for use with a screw having on the head, for example, four lateral bosses with curved side walls, there may be an axial recess having concave recesses in the side walls of the axial recess. On the two sides of a radial plane through the centre of each of these concave recesses there may be surfaces of substantially the same curvature as the curved surfaces on either side of a radial plane on the boss of the screw, but the said surfaces of the recess may be angularly spaced away from each other and joined by a surface which will give adequate clearance from the centre of the boss. In this way it is possible to provide clearance between the screw head and the tool to permit the head to be readily inserted into the tool recess and yet upon rotation of the tool with respect to the screw about their common axis, the co-operating curved surfaces of substantially equal curvature will be brought into close engagement. In practice, however, it will, as a rule, be satisfactory if the recess in the tool fits with the minimum necessary clearance of, say, one or two thousandths of an inch on the head of the screw.

It will be apparent that if the bosses on the head of the screw are of true cylindrical curvature and the lateral recesses in the tool are of like curvature, subject to necessary slight clearance, then the angle between the normal to the contacting surfaces and a line from the point of contact to the axis of the screw will vary from point to point being a maximum at the junction of one boss with the next and zero at the centre of the boss. In such case the arcuate length of the engaging surface of the recess is preferably made such that there is no engagement at places where this angle would be so great as to prevent the frictional binding from coming into effect. This effect may be produced by cutting away the walls of the recess in the tool at the places where the lateral recesses meet. It is desirable, however, that in such case the surfaces should engage over some portions where the aforesaid angle is greater than the friction angle as otherwise the tool may become irremovably locked on the screw. The effect may also be produced or assisted by making the tool head somewhat resilient so as to be capable of expansion. In this way the surfaces of the tool at the reentrant portions can to a certain extent ride up on the surfaces of the bosses.

Although for most practical purposes the said bosses may have cylindrical curvature, if it is desired that the said angle shall be constant over the whole area of contact of the bosses with the tool, the curvature of the bosses and of the said recesses may be designed to ensure this. Thus, the profile of the bosses on each side of the centre may follow an arc of an equiangular spiral such that the angle between the normal to the curve and the radius vector drawn to the centre of the screw is equal to or near the angle of friction.

In order to facilitate the rapid attachment of the screw to the tool, it is preferred to provide, preferably on the tool, a suitable spring clip or like means. Thus, for example, a spring wire or the like may be arranged on the tool so as to intersect one or more of the aforesaid lateral recesses and the screw head may be provided with one or more suitable grooves, shoulders or the like adapted to engage with the wire when the head of the screw is inserted in the recess in the tool head.

It is to be understood that a screw-driving tool may be a manually operable one or it may be a mechanically or electrically operated tool.

Whilst reference has been made to bosses on the screw head and to a recess in the tool, as already indicated, the inverse arrangement may be employed in which the tool is in the form of a key with lateral bosses and the screw head is recessed.

The head on the screw may be stamped or forged and the tool may be headed or cupped by a stamping or forging operation.

In order that the invention may be well understood preferred embodiments thereof will now be described by way of example only with reference to the accompanying drawing, in which—

Figure 1 is a perspective view of a screw head and the head of a screw-driving tool, Figure 2 is a transverse section through the tool head and screw head when the screw is attached to the tool, Figures 3 and 4 are similar views to Figures 1 and 2 respectively of a modified form of screw head and tool head, Figure 5 is a diagrammatic view showing details of the engaging surfaces of screw head and tool head in one form of the invention.

Referring to Figures 1 and 2 of the drawing, a screw 1 has a head 2 and a shank 3, a part only of which is shown. The head 2 is formed with three lateral bosses 4 having curved side walls or surfaces 5. The curved walls 5 of successive bosses meet along lines 6 at an angle of about 120°. The side walls 5 may have any suitable curvature. Thus, for example, the curve from the line 6 to the centre 7 of each boss may be an arc of an equiangular spiral in which the angle between the tangent and the radius vector (drawn to the centre 8) is equal to 90° plus an amount equal to or nearly equal to the angle of friction concerned for the materials of the screw and screwdriver, for example 90° plus 13½°=103½°. If desired, however, the surfaces 5 may be of simple circular curvature. By way of illustration the shape of the head 2 (see Figure 2) may be produced by drawing a circle (not shown) and then with centres at three equally spaced points round the circumference, drawing major arcs of three equal circles intersecting in pairs, the radius of each of these further circles being in the ratio of about 8:5 to the radius of the first circle. It will be seen that the shape of the head is approximately like that of a clover leaf.

At the base of the head is a flange 9 which may serve to prevent the screw-driving tool from being pushed too far down on to the screw or to prevent the screw from being screwed too far into the work.

The screw-driving tool is provided with a head 10 and shank 11, a part only of which is shown. The shank may be manually operated or power driven. The head 10 is provided with an axial recess 12 adapted snugly to fit on the head 2, the curved surfaces 13 of the lateral recesses corresponding to and being adapted to engage with the curved surfaces 5 of the screw head. In Figure 2 the clearances between the tool and the screw head are shown exaggerated but it will be seen that if the screw-driving tool is turned in the direction of the arrow in Figure 2 and resistance is offered to the turning of the screw, a close contact will be obtained at the places generally indicated at 14 over a substantial area. If the co-operating curved surfaces are of circular curvature it is desirable that contact between the surfaces should be avoided in the neighbourhood of the lines 6 as otherwise the tendency for locking of the screw in the tool would be very greatly reduced. Consequently the inner walls of the recess 12 are cut away at 15, i. e. where adjacent lateral recesses meet. The arrangement may be such that over the effective areas of contact the average angle between the normal to the surface and the radius drawn to the centre 8 is about equal to the angle of friction, say 13½°. If this is the case, then the screw can be firmly attached to the tool but can readily be released by turning the tool in the opposite direction. On continuing this action, of course, the screw can again be attached to the tool 1 for unscrewing the screw (or for screwing a left hand screw). At the centre parts of the curved surfaces 13 additional recesses 16 are shown to give additional clearance at the centres of the bosses 4 but these are not in general necessary.

It will be understood that when the screw head is attached or locked to the tool, the metal of the screw and screw-driving tool will be stressed and that the stresses acting between the two will be directed substantially towards the centre 8. Consequently, if the surfaces are at a suitable angle or angles near the friction angle there will be considerable resistance to unlocking which resistance will not be overcome by ordinary vibration or shaking but which can be overcome, of course, by applying a suitable couple or turning moment to overcome the friction.

In the forms of screw and screw-driving tool shown in Figures 3 and 4, four bosses 17 are provided on the screw head 18 and a corresponding number of lateral recesses is provided in the recess 19 of the tool 20. The head 18 is in this case provided with a diametral slot 21 so that the screw can be turned, if necessary with a screwdriver of conventional form. Moreover, the tool head is provided with slots 22 which intersect a pair of opposite lateral recesses of the axial recess 19. Mounted in these slots 22 and in a circumferential groove 23 is a spring wire 24 having a pair of straight sides which likewise intersect the said lateral recesses. The screw head is provided with grooves 25 in the sides of the bosses so that when the screw head is inserted into the recess 19 the wire 24 will snap into two of the grooves 25 and the screw will be attached to the tool. It will, of course, become more firmly attached when the screw encounters resistance in being screwed into the work.

A spring clip or like means could also be provided in the embodiment illustrated in Figures 1 and 2.

Moreover, of course, the screw could be provided if desired with a recessed head similar to the head of one of the tools shown in which case the tool would be provided with a head similar to that of one of the screws shown.

Referring to Figure 5 of the drawing the co-operating curved surfaces of a screw and screw-driving tool are denoted by 25, 26 and 27, 28 for one boss and corresponding recess. The surfaces 25 and 26 are illustrated diagrammatically as being in contact whilst a clearance is shown between the surfaces 27 and 28. In the form of construction diagrammatically illustrated the surfaces 26, 28 have substantially identical curvature to the surfaces 25 and 27. Pairs of points of the surfaces 26, 28 are, however, angularly spaced about the centre 29 of the screw by an amount somewhat greater than the angular distance between corresponding pairs of points of the surfaces 25, 27. In other words if the surface 26 is exactly in register with the surface 25, the position of the surface 28 would be obtained by swinging an arc of the surface 27 about the centre 29 through a small angle A. In this way a radial clearance is obtained between the co-operating surfaces whilst at the same time if the tool is rotated slightly in either direction the co-operating surfaces 25, 26 or 27, 28 are brought exactly into registry.

The near ends of the surfaces 26 and 28 may be joined by a recessed surface 30 to give clearance at this place.

If the surfaces 25 and 27 are of one continuous circular curvature of centre 0, in the position shown the surface 26 will be of the same radius with the same centre 0. The surface 28 will have the same radius but will have P as centre, lying on a circle through 0 with centre 29 and separated from 0 by the angular distance corresponding to the angle A. The surfaces 25 and 26 are shown as being in contact over a zone B and at a point C in this zone the angle between the normal C0 and the line C29 is 13½°. In the zone D the corresponding angle will be less than 13½° whilst in the remainder of the zone B the corresponding angle will be greater than 13½°. Of course, if the surfaces are not circular but follow arcs of an equiangular spiral the angle may remain constant at 13½° or other appropriate angle.

In most practical cases it will be sufficient if the surfaces 25 and 27 are of the same circular curvature and if the surfaces 26 and 28 are bored out with a very slightly larger radius of curvature to give the necessary small clearance for easy engagement of the tool with the head of the screw.

Whilst in the foregoing preferred embodiments of the invention have been described and illustrated by way of example it will be understood that various modifications may be made without departing from the scope of the invention. Thus, for example, more than four bosses may be provided if desired.

I claim:

1. A screw having a head with at least three lateral bosses having convex curved side walls, the curvature of which follows an arc of an equiangular spiral.

2. A screw having a head with at least three lateral bosses having laterally curved side walls concave towards the screw axis and on the side walls surface irregularities adapted to be engaged by spring means carried by a screw-driving tool.

3. A screw having at least three lateral curved surfaces of curvature concave towards the screw axis and not concentric with one another or with the screw axis and not forming parts of a common wholly inwardly concave closed curve, said surfaces being adapted to be engaged in one direction of rotation by appropriately formed surfaces of a screw driving tool, and each of said surfaces being such that at every point in an arcuate zone subtending an appreciable angle at the screw axis, the angle between the normal to the surface at that point and a line joining the point to the screw axis being not greater than 16°.

GRANVILLE BRADSHAW.